United States Patent [19]

Mason et al.

[11] 4,362,131

[45] Dec. 7, 1982

[54] ENGINE COOLING SYSTEM

[75] Inventors: John L. Mason; Robert C. Emmerling, both of Los Angeles, Calif.

[73] Assignee: The Garrett Corporation, Los Angeles, Calif.

[21] Appl. No.: 215,206

[22] Filed: Dec. 10, 1980

[51] Int. Cl.³ ............................ F01P 3/12; F01P 7/14
[52] U.S. Cl. ................................ 123/41.1; 123/41.29; 123/41.31; 123/41.33
[58] Field of Search ................. 123/41.08, 41.09, 41.1, 123/41.29, 41.31, 41.33, 41.02, 41.44

[56] References Cited

U.S. PATENT DOCUMENTS

| | | | |
|---|---|---|---|
| 3,018,617 | 1/1962 | Kelgard | 60/13 |
| 3,134,371 | 5/1964 | Crooks | 123/41.31 |
| 3,162,998 | 12/1964 | Williams | 60/13 |
| 3,229,456 | 1/1966 | Gratzmuller | 60/13 |
| 3,232,044 | 2/1966 | Gratzmuller | 60/13 |
| 3,397,684 | 8/1968 | Scherenberg | 123/179 |
| 3,439,657 | 4/1969 | Gratzmuller | 123/41.31 |
| 3,442,258 | 5/1969 | Ruger et al. | 123/41.31 |
| 3,483,854 | 12/1969 | Foran et al. | 123/41.31 X |
| 3,863,612 | 2/1975 | Wiener | 123/41.08 |
| 3,872,835 | 3/1975 | Deutschmann | 123/41.31 |
| 4,061,187 | 12/1977 | Rajasekaren et al. | 123/41.31 X |

FOREIGN PATENT DOCUMENTS

| | | |
|---|---|---|
| 1140018 | 11/1962 | Fed. Rep. of Germany . |
| 1220199 | 6/1966 | Fed. Rep. of Germany . |
| 1223196 | 8/1966 | Fed. Rep. of Germany . |
| 2335248 | 1/1975 | Fed. Rep. of Germany . |
| 2655017 | 6/1978 | Fed. Rep. of Germany . |
| 47-36531 | 1/1972 | Japan . |
| 950020 | 2/1964 | United Kingdom . |

Primary Examiner—William A. Cuchlinski, Jr.
Attorney, Agent, or Firm—Stuart O. Lowry; Albert J. Miller

[57] ABSTRACT

An engine cooling system comprises an integrated arrangement for pumping liquid coolant with a single pump through an engine and into heat exchange relation with various auxiliary heat loads in a combustion engine system. The coolant is further circulated by the pump from the engine and the various auxiliary heat loads to a single dissipation heat exchanger for dissipation of the absorbed heat energy. The cooling system is designed for maintenance of the engine and the auxiliary heat loads at individually selected operating temperature levels.

31 Claims, 1 Drawing Figure

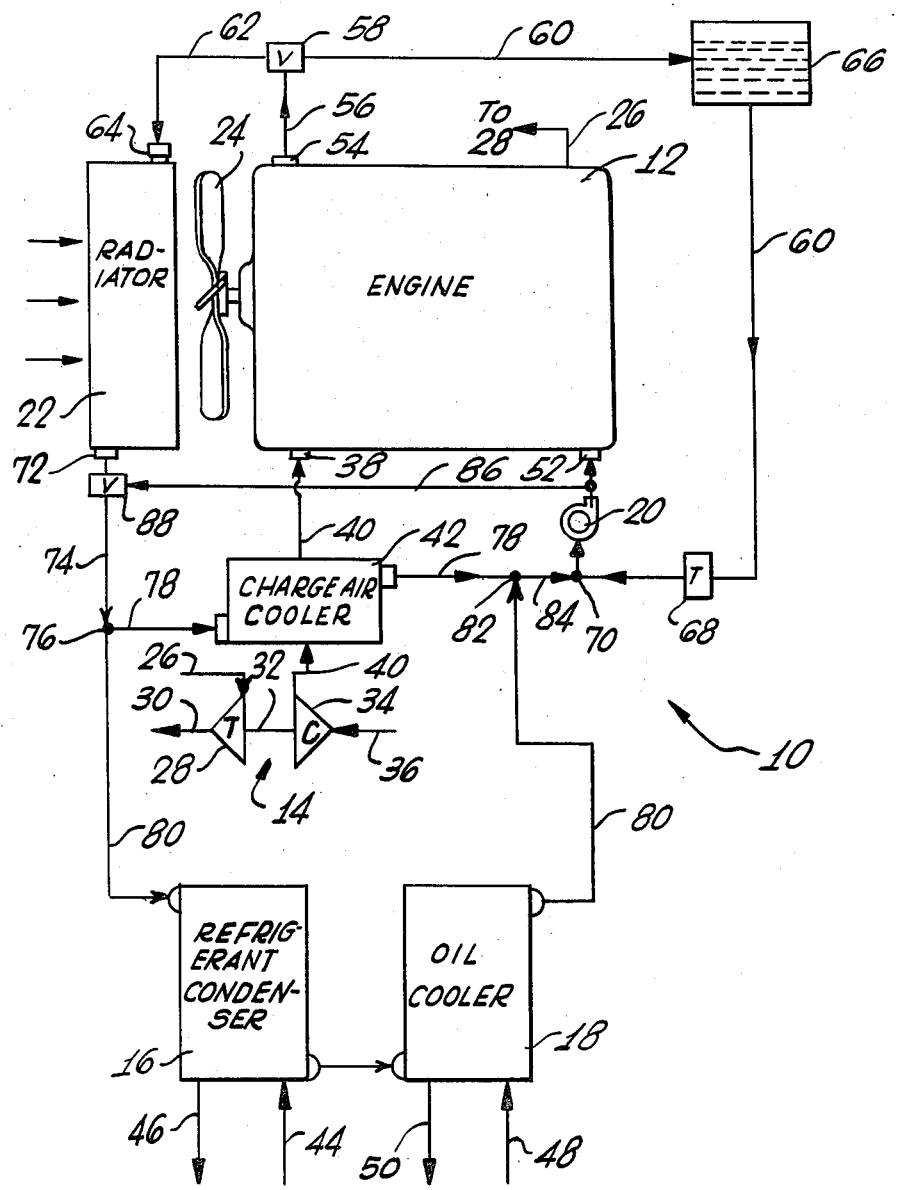

ENGINE COOLING SYSTEM

BACKGROUND OF THE INVENTION

This invention relates in general to cooling arrangements for combustion engine systems. More specifically, this invention relates to an improved integrated engine cooling system having a single pump for supplying liquid coolant to the engine and auxiliary heat loads in an engine system, and a single heat exchanger or radiator for dissipating the heat energy generated by the engine and the auxiliary heat loads.

Cooling systems in general are well known in the art for use in absorbing and dissipating heat energy generated by a combustion engine. For example, it is well known to provide a pump to circulate a liquid coolant through internal flow passages in an internal combustion reciprocating engine for absorbing excess heat energy thrown off by the engine, and then to circulate this heated coolant to a heat exchanger such as a conventional radiator for dissipation of the absorbed heat energy. In a typical vehicular engine system, the coolant discharged from the radiator is recycled by the pump to the engine to provide the engine with a continuous flow of the liquid coolant. As a result, the engine is maintained at a selected operating temperature level according to the flow rate of the coolant and the cooling capacity of the radiator.

In many combustion engine systems, auxiliary heat loads are present which also must be maintained at a controlled operating temperature level. By way of example, in a turbocharged or supercharged engine system wherein ambient air is compressed prior to supply to the air intake of the engine, it is frequently advantageous to extract at least a portion of the heat of compression of the air prior to supply to the engine in order to further increase the air density and to reduce the overall engine heat load. To this end, a so-called charge air cooler heat exchanger is typically provided for passage of the heated compressed air in heat exchange relation with a cooling fluid, commonly a liquid coolant. In some arrangements, the liquid coolant is shared with the primary engine cooling system, and in other arrangements the liquid coolant is separate from the primary engine cooling system. In either event, the liquid coolant from the charge air cooler heat exchanger must be circulated through a cooling heat exchanger to maintain the coolant temperature within prescribed limits.

Additional sources of heat are also commonly present in many combustion engine systems. One such source of heat comprises the lubricating oil for the engine and/or turbocharger wherein the oil must be cooled to within a prescribed temperature range to prevent overheating and excess wear of mechanical components. Another common heat source comprises vaporized refrigerant within an engine driven air conditioning system wherein heat must be extracted from the refrigerant to re-condense the vapor for continuous operation of the air conditioning system. Still another commonly encountered heat load comprises the transmission fluid in a vehicular application wherein the fluid must be cooled to a prescribed temperature to prevent overheating of transmission components. In each instance, it is known to provide a heat exchanger through which a cooling fluid, such as a liquid coolant, is passed in heat exchange relation with the heat source to absorb heat therefrom. Once again, when a liquid coolant is used, it is necessary to circulate the coolant from the appropriate heat exchanger through a cooling heat exchanger to maintain the liquid coolant within prescribed temperature limits.

In the prior art, various cooling system schemes have been proposed for controlling the operating temperature levels of various heat sources or heat loads in a combustion engine system. Some of these schemes comprise separate liquid cooling circuits for each heat source, but these arrangements tend to be relatively bulky and costly in that they require a relatively large number of plumbing connections for the coolant and a relatively large number of cooling heat exchangers for dissipating collected heat energy. See, for example, U.S. Pat. Nos. 3,229,456; 3,439,657; 3,872,835; and German Publication No. 2,655,017, which disclose the use of multiple heat exchangers for dissipating heat energy from multiple heat sources in an engine system. Other systems have been proposed which attempt to integrate more than one heat source into a single liquid cooling circuit to reduce system complexity and cost. See, for example, British Pat. No. 950,020; German Pat. No. 1,140,018; and German Publication No. 2,335,248, which show a charge air cooler heat exchanger coupled in series with an engine radiator and in parallel with the engine. See also U.S. Pat. Nos. 3,162,998; 3,397,648; 3,442,258; and German Pat. No. 1,223,196, which disclose a charge air cooler heat exchanger coupled in series with both an engine radiator and the engine. However, these various prior art systems have not been totally satisfactory in tht they have not provided for close and individually selected control of the operating temperature levels of the various heat sources in the engine system. Moreover, these prior art arrangements have not been adapted for use with multiple auxiliary heat sources in the engine system, such as, for example, lubricating oil, vaporous refrigerant, and the like.

Still other systems have been proposed in the prior art in an attempt to provide temperature control of the various auxiliary heat sources in an engine system. Such other arrangements typically seek to divide flow of liquid coolant among the various heat sources in the engine system, and to provide flow control for the coolant to yield the desired operating temperatures. See, for example, U.S. Pat. No. 3,134,371. However, such arrangements tend to rely upon complex coolant flow circuitry together with multiple coolant flow mixing valves and circulation pumps to achieve the desired operating conditions.

The present invention overcomes the problems and disadvantages of the prior art by providing an improved cooling arrangement for a combustion engine system including a single heat exchanger for dissipating heat energy generated by multiple heat sources in a combustion engine system, in combination with a simplified and practical coolant flow system utilizing a single pump for circulating coolant flow to the various system heat sources for maintaining close and individual temperature control of the various heat sources.

SUMMARY OF THE INVENTION

In accordance with the invention, an engine cooling system is provided for maintaining close operating temperature control of multiple heat sources in a combustion engine system. The cooling system comprises a single circulation pump connected for circulating liquid coolant into and through a combustion engine for absorbing heat generated by the engine. The efflux of liquid coolant from the engine is divided into a first portion for recycle flow to the intake of the circulation pump, and a second portion for flow through a heat dissipation heat exchanger and then in heat transfer relation with auxiliary system heat sources prior to return to the intake of the circlation pump.

In the preferred embodiment of the invention, the portion of the liquid coolant supplied to the dissipation heat exchanger flows without restriction through the dissipation heat exchanger for maximum temperature reduction of the coolant. Ambient air is drawn by a fan or the like over the surfaces of the heat exchanger for reducing the temperature level of the coolant. From this heat exchanger, the coolant is divided for parallel flow through a charge air cooler heat exchanger for reducing the temperature level of compressed air supplied to the engine from a turbocharger or the like, and through in series a refrigerant condenser and an oil cooler prior to collection and return to the intake of the circulation pump. This now partially warmed liquid coolant is mixed with the recycled uncooled portion of the liquid coolant prior to return to the pump intake, whereupon the mixed coolant portions are recirculated to the engine for absorption of additional heat energy.

The various components in the cooling system of this invention are matched with respect to each other to provide the desired flow rate of coolant at the appropriate temperature level in heat exchange relation with each of the various system heat sources. For example, the major portion of the efflux of liquid coolant from the engine is recycled through a recycle conduit to the circulation pump and through the engine without cooling to provide a relatively high coolant flow rate through the engine. A throttle device is provided along the recycle conduit for controlling the quantity of recycled coolant in relation to the quantity of coolant circulated to the dissipation heat exchanger. The relative quantities are selected so that sufficient coolant at appropriate temperature levels is circulated in communication with the auxiliary heat sources and then mixed with the recycle flow to reduce sufficiently the overall temperature of the total coolant flow pumped through the engine.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawing comprises a schematic diagram illustrating the engine cooling system of this invention.

DETAILED DESCRIPTION OF THE PREFERRED EMBODIMENT

As illustrated in the exemplary drawing, an engine cooling system 10 is provided for use with a combustion engine 12, such as a reciprocating gasoline or diesel-powered engine of the type commonly used in automotive and/or truck vehicular applications. The engine 12 comprises a portion of an overall engine system including, for example, a turbocharger 14, a refrigerant condenser 16, and an oil cooler 18. The cooling system 10 of this invention comprises a single circulation pump 20 for pumping a liquid coolant through appropriate conduits, as will be described, to the various components of the engine system to absorb excess heat energy, and for further circulation through a single cooling heat exchanger 22 for appropriate dissipation of the collected heat energy. As illustrated, the single heat exchanger 22 can comprise a conventional radiator across which cooling air can be drawn by means of an engine-driven fan 24.

The cooling system 10 of this invention comprises a substantial improvement over cooling systems found in the prior art by providing an integrated arrangement for effective and close temperature control of multiple heat sources in a combustion engine system. The cooling system 10 of this invention is relatively simple in design and construction, and integrates the various engine system heat sources into a single liquid coolant flow circuit arrangement. The liquid coolant thus can be circulated by the single circulation pump to the various system heat sources, and the generated heat energy collected by the coolant can be dissipated in the single cooling heat exchanger or radiator 22. The result is a compact and simplified arrangement for close temperature control of the various heat sources at individually selected operating temperatures.

In operation, the engine 12 combusts a mixture of fuel and air to rotatably drive an engine crankshaft (not shown), all in a well-known manner. However, the engine also generates a substantial quantity of excess heat energy which must be removed from the engine to prevent overheating and resultant damage to engine components. In practice, it is known to circulate a liquid coolant through appropriate cooling jackets (not shown) within the engine to absorb and remove this excess heat energy. Typically, the coolant is supplied to the engine at a temperature and flow rate to maintain a steady state engine operating temperature on the order of about 225 degrees F.

In the engine system illustrated in the drawing, the turbocharger 14 is provided for supplying combustion air to the engine 12 at an elevated pressure level. Specifically, exhaust gases from the engine are expelled through an exhaust conduit 26 for driving communication with a turbine 28 of the turbocharger 14. Before exhaustion to atmosphere through a conduit 30, the exhaust gases rotatably drive the turbine 28 at a relatively high speed of rotation. The turbine 28 is connected by a common shaft 32 to a compressor 34 of the turbocharger, whereby the turbine 28 drives the compressor 34 at a corresponding high speed of rotation.

When rotated, the compressor 34 draws in ambient air through an intake 36 and compresses that air for supply to an air inlet 38 of the engine 12 via an air inlet conduit 40. This supply of compressed air to the engine 12 is advantageous in that it enables the engine to operate at relatively higher power levels and with increased load-carrying capacity. However, compression of the air also substantially increases the temperature level of the air, resulting in a potential substantial increase in the overall heat load of the engine. It is therefore desirable to reduce the temperature of the compressed air prior to supply to the engine to reduce the engine heat load as well as to further increase the density of the compressed air. For this purpose, the illustrated engine system includes a charge air cooler heat exchanger 42 along the length of the air inlet conduit 40, and a portion of the liquid coolant is circulated by the circulation pump 20 through this heat exchanger 42 to maintain the temperature level of the compressed air within prescribed operating limits. The specific coolant flow arrangement with respect to the pump 20 and the radiator 22 will be described in more detail.

The illustrated engine system also includes the refrigerant condenser 16 and the oil cooler 18. The refrigerant condenser 16 comprises a portion of an engine-driven air conditioning system (not shown) wherein vaporous refrigerant is circulated to the condenser 16, as illustrated by arrow 44. The vaporous refrigerant is re-condensed within the condenser 16 to liquid form by extraction of heat energy from the refrigerant, whereupon the refrigerant is returned to other components of the air conditioning system as illustrated by arrow 46. Similarly, lubricating oil for the engine 12 and/or the turbocharger 14 is circulated by appropriate means (not shown) to the oil cooler 18, as illustrated by arrow 48, for reduction of the oil temperature within the oil cooler 18 and subsequent return to the engine and/or turbocharger as illustrated by arrow 50. Importantly, both the refrigerant condenser 16 and the oil cooler 18 are connected for flow passage of a portion of the liquid coolant of the cooling system 10 of this invention for proper maintenance of the temperature levels of the refrigerant and the lubricating oil, respectively.

The circulation pump 20 of the engine cooling system 10 of this invention is appropriately driven in any suitable manner to discharge the liquid coolant, such as a mixture of water and ethylene glycol, into the engine 12 via a coolant intake fitting 52. The liquid coolant circulates through the various cooling jackets (not shown) in the engine to absorb excess heat energy. The coolant then exits from the engine 12 via an outlet fitting 54 for flow through a relatively short conduit 56 to a splitter valve 58.

The splitter valve 58 divides the heated liquid coolant into two separate portions for recycle flow back to the intake of the circulation pump and for flow through the engine radiator 22, respectively. More specifically, the splitter valve 58 recycles a first portion of the coolant through a recycle conduit 60 to the intake of the pump 20, and a second portion of the coolant is separated for flow through another conduit 62 to an inlet 64 of the radiator 22. If desired, the splitter valve 58 can be made responsive to the temperature level of the coolant discharged from the engine 12 to adjust the flow magnitudes through the respective conduits 60 and 62 in response to this temperature level. During steady state operation, however, the splitter valve 58 is designed to recycle the substantial majority of the coolant through the recycle conduit 60, with a ratio of the flow through the recycle conduit 60 with respect to the flow to the radiator 22 being on the order of about 10:1.

The recycle conduit 60 is, in a preferred embodiment, interrupted along its length by a surge tank 66 which assists in handling the relatively high coolant flow rate through the recycle conduit. A throttle device 68 of suitable construction and operation is positioned along the recycle conduit 60 downstream of the surge tank 66 for back-pressuring the recycle conduit 60 to control flow of the coolant therethrough to the desired flow rate. This throttle device 68 provides a fluid flow resistance along the recycle conduit 60 immediately upstream of a mixing junction 70 where the recycle coolant is mixed with the portion of the coolant circulated through the radiator 22 prior to resupply to the intake of the pump 20, as will be described.

The portion of the liquid coolant supplied to the radiator 22 is circulated through the radiator in an unrestricted and uncontrolled manner for maximum temperature reduction of the coolant. Since the flow rate of coolant through the radiator is relatively low, particularly as compared to the recycle flow, substantial temperature reduction of the coolant is achieved.

The cooled portion of the liquid coolant exits the radiator through an outlet 72 for flow through a relatively short conduit 74 to a splitter junction 76. From the splitter junction, the cooled portion of the coolant is divided roughly into equal portions for flow in parallel through a first conduit 78 to the charge air cooler heat exchanger 42, and through a second conduit 80 for flow in series through the refrigerant condenser 16 and the oil cooler 18. Importantly, the specific ratio of the fluid flows through the first and second conduits 78 and 80 is determined by the required coolant flow rate through the various components for maintenance of the auxiliary heat sources at individually selected operating temperature levels. The precise fluid flows through the conduits 78 and 80 can be controlled, for example, by adjustment of the relative resistances to fluid flow provided by the charge air cooler heat exchanger 42, the refrigerant condenser 16, and the oil cooler 18.

The flow of liquid coolant through the charge air cooler heat exchanger 42 serves to reduce the temperature of the compressed air supplied to the engine 12 with a related increase in the temperature of the associated portion of the coolant. Similarly, the flow of liquid coolant in series through the refrigerant condenser 16 and the oil cooler 18 serves respectively to reduce the temperature level of the refrigerant and the lubricant oil with related serial increases in the temperature of the associated portion of the coolant. Importantly, with this specific coolant flow arrangement, relatively low temperature liquid coolant is supplied to both the charge air cooler heat exchanger 42 and the refrigerant condenser 16 to satisfactorily extract heat from the fluids in both of those components. At the same time, the temperature of the liquid coolant flowing through the oil cooler 18 is still sufficiently low for appropriate cooling of the lubricating oil.

The respective portions of liquid coolant flowing through the first and second conduits 78 and 80 are recombined downstream of their associated heat sources at a mixing junction 82. The recombined and now partially-warmed coolant is then directed through a relatively short conduit 84 to the mixing junction 70 for mixture with the recycle flow from the recycle conduit 60. The total, remixed coolant flow is coupled directly from the mixing junction 70 to the intake of the circulation pump 20 for resupply to the engine 12.

In one specific embodiment of the invention, the cooling system 10 of this invention was designed to maintain an operating temperature level of about 225° F. in a diesel powered truck engine such as a 285 horsepower engine manufactured by Mack Trucks, Inc., as Model ENDT 676. The circulation pump 20 was designed to maintain a liquid coolant flow through the engine of about 110 gallons per minute, and the splitter valve 58 divided the 225° F. coolant efflux from the engine into a flow of about 100 gallons per minute through the recycle conduit 60 and about 10 gallons per minute to the radiator 22.

The radiator 22 was selected to reduce the temperature of the portion of the coolant flowing therethrough to about 120° F. at design conditions with ambient air at a temperature of about 100° F. The thus-cooled coolant was then divided for flow through the first conduit 78 at about 6.0 gallons per minute and for flow through the second conduit 80 at about 4.0 gallons per minute. With these design conditions, and with appropriate selection of the charge air cooler heat exchanger 42, refrigerant condenser 16, and oil cooler 18, the compressed air supplied to the engine 12 was reduced in temperature from about 350° F. to about 140° F. with the coolant discharged from the heat exchanger 42 having a temperature level of about 185 degrees F. Moreover, the refrigerant discharged from the refrigerant condenser 16 was reduced to about 140° F. and the lubricating oil in the oil cooler 18 was reduced from about 205° F. to about 185° F., with the coolant discharged from the oil cooler 18 having a temperature level of about 180° F.

The partially warmed coolant flows were recombined at the mixing junction 82 to yield a combined flow at a temperature of about 183° F., and this combined flow was mixed with 225° F. recycled coolant from the recycle conduit 60 at the mixing junction 70. The total mixed coolant flow had a reduced temperature level of about 220° F. for resupply to the circulation pump 20 and further to the inlet 52 of the engine. Thus, the system 10 provided and maintained a coolant temperature differential across the engine 12 of about 5° F. With the relatively high rate of coolant flow through the engine, this temperature differential was sufficient to maintain a relatively steady state coolant discharge temperature from the engine of about 225° F.

Additional control for the cooling system 10 of this invention can be provided for use during warm-up of the engine. Specifically, conduit 86 can be coupled between the discharge side of the circulation pump 20 and a mixing valve 88 at the discharge side of the radiator 22. This mixing valve 88 responds to the temperature of the portion of the liquid coolant discharged from the radiator 22 to open the bypass conduit 86 to controlled flow from the pump 20 to the conduit 74 when that discharge coolant temperature is below a predetermined threshold. In this manner, overcooling of the compressed air, the refrigerant, and the lubricating oil is prevented. In addition, such bypass enables the various auxiliary heat sources to contribute their generated heat energy to more rapidly increase the temperature level of the liquid coolant, and thereby speed engine warm-up. Of course, when the discharge from the radiator 22 exceeds the predetermined threshold, the mixing valve 88 closes to bypass flow for normal operation of the system.

The engine cooling system 10 of this invention thus provides a simplified arrangement including a single circulation pump 20 and a single heat dissipation radiator 22. The single radiator 22 dissipates heat generated by multiple heat sources in the engine system, while a specific conduit coupling arrangement allows for accurate temperature control of each heat source in the system.

A variety of modifications and improvements to the invention described herein are believed to be apparent to one skilled in the art. For example, alternate mens such as a supercharger can be provided for supplying compressed air to the engine. Further, the system can be adapted to accommodate additional heat sources in an engine system, such as cooling of transmission fluid, by appropriate sizing of the radiator 22 and connection of a transmission cooler, preferably in a parallel arrangement with other auxiliary heat sources, into the cooling system. Accordingly, no limitation upon the invention is intended, except by way of the appended claims.

What is claimed is:

1. In a combustion engine system including a combustion engine, a charge air cooler heat exchanger, a refrigerant condenser, and an oil cooler, an engine cooling system, comprising:
    a circulating pump for circulating a liquid coolant into and through the engine;
    splitter means for splitting the liquid coolant exiting the engine into a primary flow constituting a substantial majority of the liquid coolant for recycle to said pump and a secondary flow constituting a substantial minority of the liquid coolant;
    a cooling heat exchanger coupled to said splitter means for passage of said secondary flow to reduce substantially the temperature level thereof;
    means for dividing said secondary flow exiting said cooling heat exchanger for flow in parallel through the charge air cooler heat exchanger and through in series the refrigerant condenser and the oil cooler; and
    means for recombining said divided secondary flow and for returning the same to said pump for mixture with said primary flow and recirculation into and through the engine.

2. The engine cooling system of claim 1 wherein said cooling heat exchanger comprises a radiator.

3. The engine cooling system of claim 1 wherein said splitter means comprises a proportional valve responsive to the temperature level of the liquid coolant exiting the engine.

4. The engine cooling system of claim 1 wherein the ratio of said primary flow to said secondary flow is on the order of about 10:1.

5. The engine cooling system of claim 1 including a recycle conduit coupled between said splitter means and said pump, said recycle conduit including along its length a throttle device to control liquid flow therethrough.

6. The engine cooling system of claim 5 including a surge tank coupled along said recycle conduit upstream of said throttle device.

7. The engine cooling system of claim 1 wherein said recombining means comprises means for first recombining said divided secondary flow, and then recombining said secondary flow with said primary flow.

8. The engine cooling system of claim 1 wherein said recombining means comprises means for mixing said secondary flow with said primary flow prior to return thereof to said pump.

9. The engine cooling system of claim 1 including means for bypassing a portion of the liquid coolant from said pump directly for mixture with said secondary flow exiting said cooling heat exchanger in response to the temperature level of said secondary flow exiting said cooling heat exchanger.

10. The engine cooling system of claim 9 wherein said bypass means comprises valve means at the discharge side of said cooling heat exchanger, and a bypass conduit coupled between said pump and said valve means, said valve means being responsive to the temperature level of said secondary flow exiting said cooling heat exchanger to allow flow of liquid coolant through said bypass conduit from said pump when said temperature level is below a predetermined threshold.

11. In a combustion engine system including a combustion engine and at least two auxiliary heat sources, an engine cooling system, comprising:
    a circulation pump for circulating a liquid coolant into and through the engine;

splitter means for splitting the liquid coolant exiting the engine into a primary flow constituting a substantial majority of the liquid coolant for recycle to said pump and a secondary flow constituting a substantial minority of the liquid coolant;

a cooling heat exchanger coupled to said splitter means for passage of said secondary flow to reduce substantially the temperature level thereof;

means for dividing said secondary flow exiting said cooling exchanger for passage in parallel in heat exchange communication with the heat sources to control the temperature level of said heat sources; and means for recombining said divided secondary flow and for returning the same to said pump for mixture with said primary flow and recirculation into and through the engine.

12. The engine cooling system of claim 11 including a recycle conduit coupled between said splitter means and said pump, said recycle conduit including along its length a throttle device to control liquid flow therethrough.

13. The engine cooling system of claim 11 wherein said recombining means comprises means for mixing said secondary flow with said primary flow prior to return thereof to said pump.

14. The engine cooling system of claim 11 including means for bypassing a portion of the liquid coolant from said pump directly for mixture with said secondary flow exiting said cooling heat exchanger in response to the temperature level of said secondary flow exiting said cooling heat exchanger.

15. In a combustion engine system including a combustion engine, a charge air cooler heat exchanger, and at least one additional heat source, an engine cooling system, comprising:

a circulation pump for circulating a liquid coolant into and through the engine;

splitter means for splitting the liquid coolant exiting the engine into a primary flow constituting a substantial majority of the liquid coolant for recycle to said pump and a secondary flow constituting a substantial minority of the liquid coolant;

a cooling heat exchanger coupled to said splitter means for passage of said secondary flow to reduce substantially the temperature level thereof;

means for dividing said secondary flow exiting said cooling exchanger for passage in parallel through said charge air cooler heat exchanger and in heat exchange communication with said heat source; and means for recombining said divided secondary flow and for returning the same to said pump for mixture with said primary flow and recirculation into and through the engine.

16. The engine cooling system of claim 15 including a recycle conduit coupled between said splitter means and said pump, said recycle conduit including along its length a throttle device to control liquid flow therethrough.

17. The engine cooling system of claim 15 wherein said recombining means comprises means for mixing said secondary flow with said primary flow prior to return thereof to said pump.

18. The engine cooling system of claim 11 or 15 wherein the ratio of said primary flow to said secondary flow is on the order of about 10:1.

19. In a combustion engine system including a combustion engine, a charge air cooler heat exchanger, a refrigerant condenser, and an oil cooler, a method of cooling the combustion engine system comprising the steps of:

circulating with a pump a liquid coolant into and through the engine;

splitting the liquid coolant exiting the engine into a primary flow constituting a substantial majority of the liquid coolant for recycle to the pump and a secondary flow constituting a substantial minority of the liquid coolant;

passing the secondary flow through a cooling heat exchanger to reduce substantially the temperature level thereof;

dividing the secondary flow for passage in parallel through the charge air cooler heat exchanger and through in series the refrigerant condenser and the oil cooler; and recombining the divided secondary flow and returning the same to the pump for mixture with the primary flow and recirculation into and through the engine.

20. The method of claim 19 wherein said splitting step comprises splitting said primary and secondary flow proportionately in response to the temperature level of the coolant exiting the engine.

21. The method of claim 19 wherein the ratio of said primary flow to said secondary flow is on the order of about 10:1.

22. The method of claim 19 including throttling the primary flow to control the flow rate thereof.

23. The method of claim 22 including passing the primary flow through a surge tank prior to said throttling step.

24. The method of claim 19 wherein said recombining step comprises first recombining said divided secondary flow, and then recombining said secondary flow with said primary flow.

25. The method of claim 19 wherein said recombining step comprises mixing said secondary flow with said primary flow prior to return thereof to said pump.

26. The method of claim 19 including the step of bypassing a portion of the liquid coolant from said pump directly for mixture with said secondary flow exiting said cooling heat exchanger in response to the temperature level of said secondary flow exiting said cooling heat exchanger.

27. In a combustion engine system including a combustion engine and at least two auxiliary heat sources, a method of cooling the combustion engine system comprising the steps of:

circulating with a pump a liquid coolant into and through the engine;

splitting the liquid coolant exiting the engine into a primary flow constituting a substantial majority of the liquid coolant for recycle to the pump and a secondary flow constituting a substantial minority of the liquid coolant;

passing the secondary flow through a cooling heat exchanger to reduce substantially the temperature level thereof;

dividing the secondary flow for passage in parallel in heat exchange relation with the heat sources to absorb heat energy generated thereby; and recombining the divided secondary flow and returning the same to the pump for mixture with the primary flow and recirculation into and through the engine.

28. The method of claim 27 including throttling the primary flow to control the flow rate therof.

29. The method of claim 27 wherein said recombining step comprises mixing said secondary flow with said primary flow prior to return thereof to said pump.

30. The method of claim 27 including the step of bypassing a portion of the liquid coolant from said pump directly for mixture with said secondary flow exiting said cooling heat exchanger in response to the temperature level of said secondary flow exiting said cooling heat exchanger.

31. In a combustion engine system including a combustion engine and at least two auxiliary heat sources, a method of cooling of the combustion engine system comprising the steps of:

circulating with a pump a liquid coolant into and through the engine;

splitting the liquid coolant exiting the engine into a primary flow constituting a substantial majority of the liquid coolant for recycle to the pump and a secondary flow constituting a substantial minority of the liquid coolant;

passing the secondary flow through a cooling heat exchanger to reduce substantially the temperature level thereof;

dividing the secondary flow for passage in parallel in heat exchanger relation with the heat sources to absorb heat energy generated thereby;

recombining the divided secondary flow and the recycled primary flow; and resupplying the recombined liquid coolant to the pump for recirculation into and through the engine.

* * * * *